June 2, 1953
T. F. HARVEY
2,640,652
REVERSIBLE COIL WINDING MECHANISM
FOR STATOR WINDING MACHINES
Filed Sept. 23, 1949
2 Sheets-Sheet 1
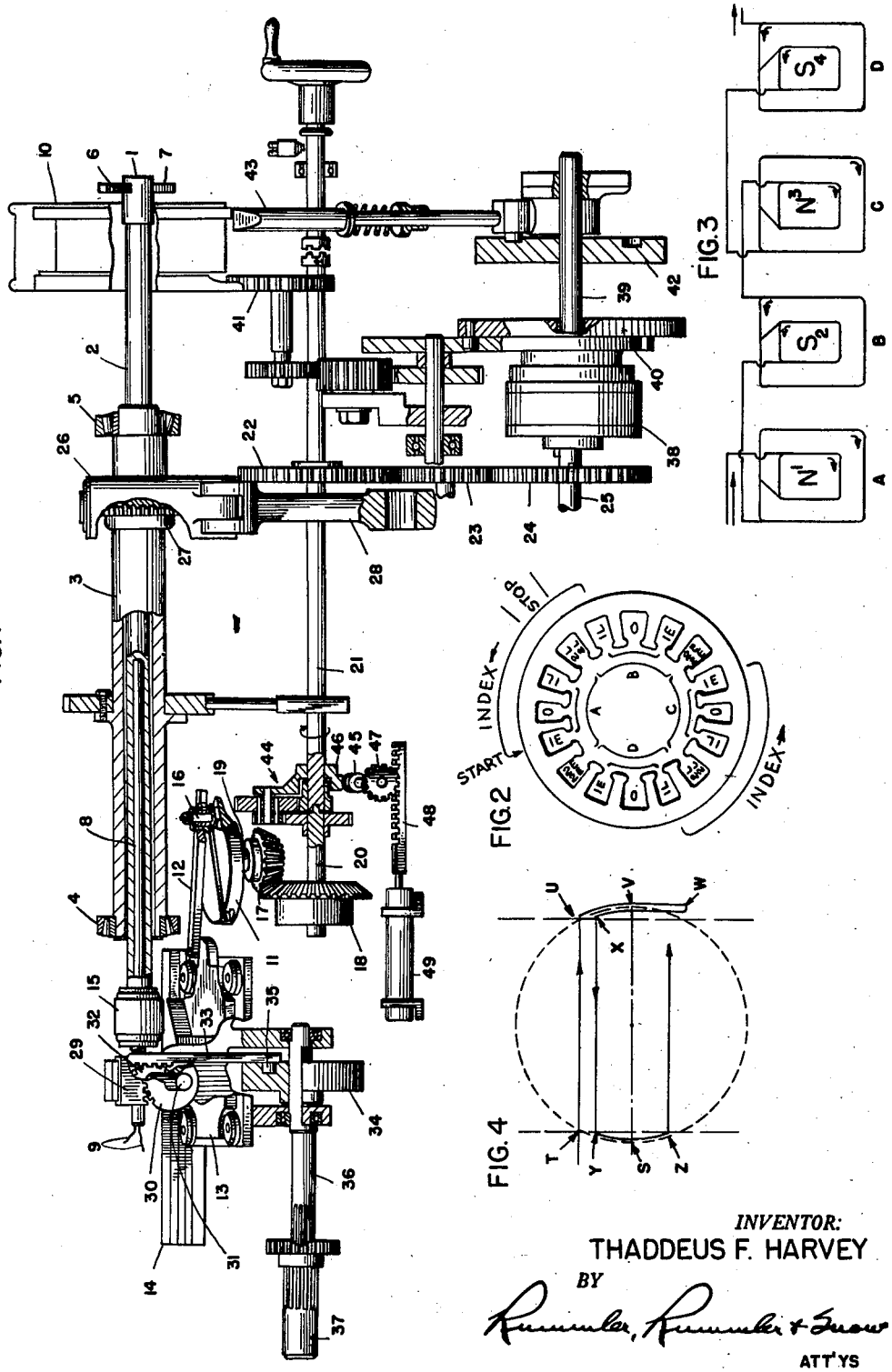
*INVENTOR:*
THADDEUS F. HARVEY
BY
Rummler, Rummler & Snow
ATT'YS

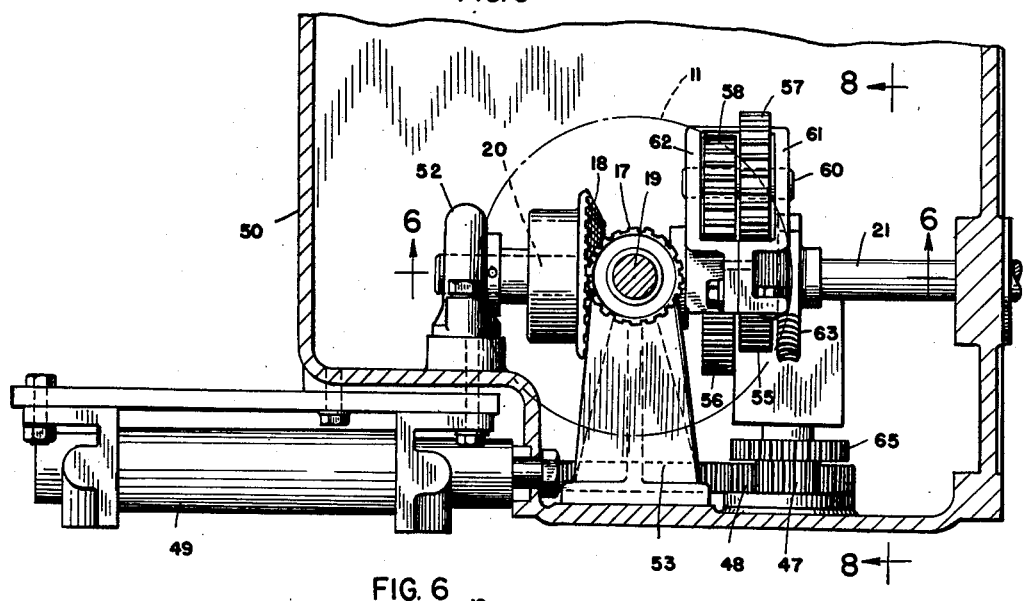
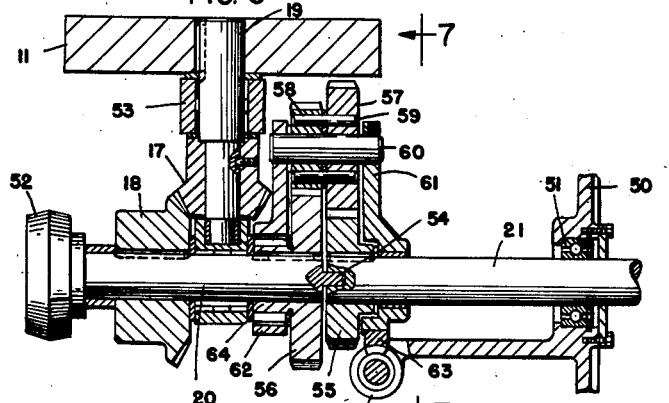
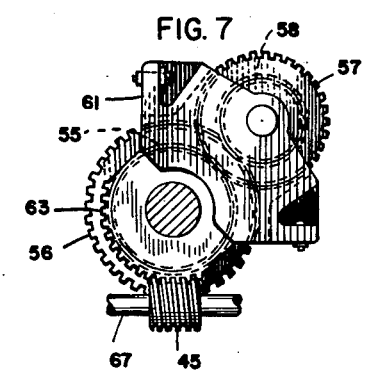 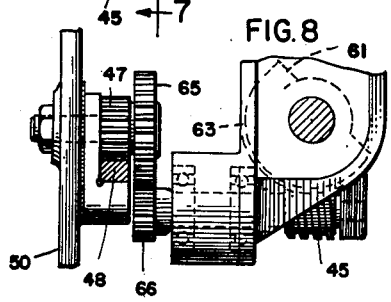

Patented June 2, 1953

2,640,652

UNITED STATES PATENT OFFICE 2,640,652

REVERSIBLE COIL WINDING MECHANISM FOR STATOR WINDING MACHINES

Thaddeus F. Harvey, South Bend, Ind.

Application September 23, 1949, Serial No. 117,343

9 Claims. (Cl. 242—1)

This invention relates to stator winding machines and particularly to improvements in the operating mechanism for the wire carrying, coil winding, component of the winding machine whereby alternate coils or poles may be wound automatically in opposite directions without interruption of the normal operation of the machine as a whole.

The main objects of this invention are to provide an improved mechanical means for effecting reverse winding of alternate poles or coils in a stator for an electric machine; to provide such a means that will operate automatically; and to provide such a means that will operate without interruption of the primary driving mechanism of the winding machine, or of the normal operation of the other mechanical components thereof.

Other principal objects of this invention are to provide a simple and positive means to control the action of a wire gun to effect reversal of winding direction; to provide such means that will reverse the winding direction of successive coils without interruption of the associated span control mechanism; to provide such means that will not affect the accuracy of the span control mechanism; to provide such means that may be readily and accurately controlled and timed for any predetermined number of turns in the coil windings; to provide such means that may be accurately coordinated with automatic fixture indexing means for continuous operation of the winding machine to wind a complete stator; and to provide an improved method of reverse winding alternate coils or poles of the stator of an electric machine.

A specific embodiment of this invention is shown in the accompanying drawings in which:

Figure 1 is a schematic plan view of the wire gun and fixture indexing components of a stator winding machine embodying my invention.

Fig. 2 is a diagrammatic end view of a four pole stator illustrating the alternate relation of the pole windings and the paths that must be followed by the wire guide fingers of the wire gun.

Fig. 3 is a diagrammatic plan view showing the pole windings in developed relation and illustrating the reverse winding of alternate poles.

Fig. 4 is a diagrammatic view showing the path of a wire gun finger during two cycles of the winding machine operation and illustrating the manner in which reversal of winding direction is accomplished.

Fig. 5 is a plan view of the reversing mechanism as embodied in the wire gun stroke drive of a stator winding machine.

Fig. 6 is a sectional view of the same as taken on line 6—6 of Fig. 5.

Fig. 7 is an end view of the same as taken on line 7—7 of Fig. 6, and

Fig. 8 is another end view of the same as taken on line 8—8 of Fig. 5 and showing the driving connection between the wind reversing mechanism and its actuating means.

The wire gun or coil winding component of a stator winding machine, as illustrated in Fig. 1, and in which the present invention is embodied, is substantially the same as that described in my Patent No. 2,542,515 issued February 20, 1951, for Intermittent Movement Mechanism, which application particularly describes and claims an improved means for actuating and controlling the span operation of the wire gun. The present invention is concerned with an improved means for actuating and controlling the stroke operation of the wire gun whereby the direction of winding of alternate coils, or poles, of a stator is automatically reversed while the winding machine is in continuous operation and without interruption of the normal functions of the several components of the machine.

In the form shown in Fig. 1 the wire gun comprises a cylindrical head 1 mounted on a reciprocable hollow shaft 2 which is slidably keyed within a hollow carrier tube 3. The carrier tube 3 is rotatably mounted in fixed end bearings 4 and 5 and serves as the main support for the wire gun mechanism and the means for imparting the span movement to the head 1.

As shown the head 1 carries a pair of opposed radial fingers 6 and 7, which are reciprocably mounted in the head and which serve as leaders for the wire strands, with which the coils or windings of the stator are formed, and these fingers are actuated by a hollow finger control rod 8 which extends through the entire length of the shaft 2 and into the head 1. The wire strands 9, one for each of the fingers 6 and 7, are led to the head 1 through the hollow finger-control rod 8 and emerge from the head 1 by way of the radial fingers 6 and 7, as will be readily understood by those skilled in this art.

The wire gun head 1 is of a size to pass through the core, or central opening, of a stator, not shown, fixedly mounted in a suitable fixture 10, which in turn may be rotatably mounted for indexing the stator in relation to the fingers 6 and 7 in order to form the successive angularly spaced coils. Details of the head construction and the means for radially reciprocating the fingers 6 and 7, to project them from the head and withdraw them into the head, are not shown since they are not a part of the present invention and means for accomplishing that purpose are well known in the art. It will be understood, however, that operation of the fingers is accomplished through reciprocation of the finger-control rod 8 within and independently of the hollow head shaft 2.

As shown in Fig. 2 the stator is formed with a plurality of angularly spaced axially extending slots within which the turns of wire, making up the respective pole coils, are laid and it is the function of the wire gun 1 to lead the wire along one slot during a stroke through the stator, turn angularly through a predetermined span distance into finger alignment with another slot, make a second or return stroke through the stator, and then turn angularly through the span distance to align the respective finger with the first slot. This comprises one cycle of winding machine operation and the cycle is repeated for as many times as there are to be turns in the coil being formed.

During this cycle of operation the fingers 6 and 7 are retracted during the stroke, or passage of the head 1 through the stator, and are extended or radially projected at the end of each stroke and during the span or angular turning period. Thus the wire is laid along the slot opening during the stroke of the wire gun and is bottomed in the slot, and lead through the span distance to the return slot, during the span movement of the wire gun. The stroke action of the wire gun, in the arrangement shown, is continuous, in simple harmonic motion, and the extension and retraction of the fingers 6 and 7, as well as the span movement, occur during the end period of each stroke, after the head 1 has passed through the stator, as indicated in the diagram of Fig. 4. Thus the stroke operation of the wire gun, the operation of the wire guide fingers 6 and 7, and the span movement must all be in precisely timed relation with each other.

As shown in Fig. 1 the stroke operation of the wire gun head 1 and its shaft 2 is obtained by means of a crank 11, which, through a connecting rod 12, reciprocates a carriage 13 mounted to slide along appropriate ways 14 (only one of the ways being shown). The carriage 13 has a bearing 15 mounted fixedly thereon and the hollow wire gun shaft 2 extends through and is journaled in the bearing 15. The shaft 2 is fastened against axial movement in the bearing 15 by means of suitable lock collars secured to the shaft 2 at each end of the bearing. Thus, though the shaft 2 is rotatable in the bearing 15, the bearing, as it reciprocates with the carriage 13, carries the shaft and causes it to reciprocate to the same extent.

In the form shown the crank pin 16 is shiftable radially along a T slot formed in the face of the crank wheel 11, and thereby the length of the connecting rod stroke, and hence the stroke of the wire gun shaft 2, may be varied to accommodate stators of different lengths. Such an arrangement of the crank is an old practice and it will be understood that the crank pin 16 is arranged to be secured fast in any position it may be set.

Rotation of the crank 11 is obtained through a pair of bevel gears 17 and 18, mounted respectively on the crank shaft 19 and an extension 20 of a drive shaft 21, the drive shaft 21 receiving its power through a chain of gears 22, 23 and 24 from a main power shaft 25. The power shaft 25 drives all of the several operating components of the stator winding machine and in this manner the timing of the several components, in relation to each other, is maintained.

In the form of the apparatus shown in Fig. 1, the span operation of the wire gun is accomplished by oscillation of the carrier tube 3 at predetermined intervals and is effected by means of a rack 26, operating in suitable guides, which coact with a ring gear 27 mounted fast on the carrier tube 3. The rack 26 is reciprocated by a connecting rod 28 which in turn may be driven by a span control mechanism, not shown, such as that described in my before mentioned Patent No. 2,542,515.

In the form shown in Fig. 1 the means for reciprocating the finger-control rod 8 is mounted directly on the carriage 13, since in its operation the control rod 8 is moved axially relative to the wire gun shaft 2 and must travel with the shaft 2 as the latter reciprocates to cause the stroke operation of the wire gun head 1. As shown the control rod actuating means comprises a tail piece 29 mounted on the rear end of the control rod 8 and having rack teeth thereon which mesh with a gear 30 mounted on a shaft 31 journaled on the carriage 13. The shaft 31 carries a second gear 32 which in turn is meshed with a rack bar 33 slidably mounted in suitable fixed ways formed in the carriage structure. The rack bar 33 is driven by a face cam 34 having a suitable cam track in which a cam follower 35, mounted on the end of the rack bar 33, engages. The cam track is not shown but will be understood to be formed to cause reciprocation of the rack bar 33 at appropriate intervals in each cycle of operation of the wire gun.

The cam 34 is mounted on a shaft 36, which in turn is journaled in suitable bearings carried by the carriage 13, and the shaft 36 is arranged with a sliding splined connection with a fixed-position shaft 37 suitably mounted in the winding machine structure and continuously driven through a suitable positive connection, not shown, from the main power shaft 25 or its power source.

As shown the mechanism for indexing the stator fixture 10, to shift the pole position of the stator when the winding of one set of poles is completed, is also driven from the main power shaft 25. In this case, since the operation is intermittent, the driving power is transmitted through an automatic clutch 38, designed to turn through only a predetermined angular extent upon each operation, the clutch being operated at predetermined intervals according to the number of machine cycles, or complete winding turns, desired for each pole of the stator. The clutch 38 drives a shaft 39, on which a gear 40 is mounted. The gear 40 then drives a train of gears which terminates in a gear 41 which is directly meshed with a suitable ring gear, not shown, mounted on the fixture 10. The shaft 39 also operates a cam 42, which in turn operates an automatic indexing pin 43 designed to lock the fixture 10 in proper position and positively hold it during the winding operations for each coil or pole of the stator.

The automatic clutch 38, above-mentioned, is a common device known in the art as a "single-turn" or "single revolution" clutch. Ordinarily, this clutch is controlled by a trip lever, not shown, mounted beside the clutch and designed to contact a step on an annular trip cam which rotates with the intermittently driven clutch member. Engagement of the trip lever with the cam step renders the clutch inoperative; and release of the trip lever causes automatic and instantaneous driving connection of the clutch parts. A single step on the trip cam of this clutch will permit a single full revolution of the intermittent clutch members, or multiples of one revolution through control of the trip lever; and multiple steps on the trip cam will permit fractional revolution of the intermitent member according to the angular disposition of the trip cam steps.

As is well known in the art, the operation of the trip lever may be by mechanical means, or electrically as by a solenoid, and such operation may be controlled by any suitable timing or counting mechanism, positively driven by the winding machine, which will act upon completion of a predetermined number of cycles of machine operation. Such a timing means is not herein shown and described since no invention is claimed for the same and any of several known types and arrangements of suitable control devices may be readily employed for the desired purpose.

For example, the cycle or turn counting means disclosed in Patent No. 2,445,937 issued July 27, 1948 to D. E. Carpenter, to which reference is made for details of its construction and operation, may be readily adapted for use with the present machine.

Fig. 3 shows the direction of the winding turns for a four pole stator, in which each pole is wound with two coils, and Fig. 2 shows the angular relationship of the several coils. Since the wire gun is provided with the two diametrically opposite wire guide fingers 6 and 7, the device will simultaneously wind two diametrically opposite stator poles: and, as shown in Fig. 2, each coil occupies two stator slots located on either side of a center slot which is the pole core. In the diagram of Fig. 2, the letters at the center represent the pole numbers and the indices in the stator slots indicate the respective slots for the first and second coil of each pole, the zero indicating the pole center. The letters "E" and "L" indicate the slots over which the wire gun fingers pass when the wire gun enters the stator on the first stroke of the winding cycle and when the wire gun leaves the stator on the second stroke, respectively. It is the function of the wire gun to lay the winding wire in the respective coil slot during each stroke and to make the span between the slots at the end of each stroke so that a complete turn will be formed around the respective pole during each cycle of winding machine operation.

The change of the span distance for the first or inner coil, of each pole and the second, or outer coil, is performed automatically by the span control mechanism, operating the rack 26, upon the completion of each coil winding. The span change mechanism, itself, is not a part of the present invention and is not herein shown. It is, however, fully described in my before mentioned Patent No. 2,542,515.

It will now be seen that upon completion of the winding of the second or outer coils, of the poles A and C, which are wound simultaneously, the angular relationship of the wire gun and the stator must be changed to effect winding of the coils for the poles B and D. In the embodiment of this invention herein shown, this change of angular relationship is accomplished by rotating, or indexing, the fixture 10, in which the stator is held, through a turn of 90°, or a sufficient angular distance about its axis to locate the poles B and D at the positions formerly held by the poles A and C. This is accomplished automatically, at the proper time, by the indexing mechanism actuated by the clutch 38, and the indexing distance and direction is indicated by the peripheral lines and arrows in Fig. 2.

It will now be seen from Fig. 2 that at the start of the winding operation the wire gun fingers will lay a wire in slot 1E, of coils A and C, during the first, or entering, stroke; span the distance between slots 1E and 1L at the end of the first stroke; lay the wire in slot 1L during the second, or leaving, stroke; and finally span the distance between 1L and 1E at the end of the second stroke to complete one operation cycle or one coil turn. When the first or inner coils of poles A and C are completed, with the required number of wire turns, the span change mechanism automatically alters the span distance during the last span movement and the wire is laid in slots 2E and 2L, in the same manner as in the case of the first pair of slots.

When the winding of the second, or outer coils, of poles A and C are completed the wire gun-stator relationship is changed automatically by the indexing mechanism and the winding of poles B and D is begun, the span change mechanism having in the meantime altered the span distance to the angular spacing of slots 1E and 1L. In the case of poles B and D, however, the coils must be wound in the opposite direction than that of the windings of poles A and C, and it is at this point in the winding machine operation that the reversal of the sequence of wire gun movements takes place.

It is one of the purposes of this invention to effect automatic reversal of the wire gun movements without interruption of the normal operations of the winding machine as a whole, and in the present embodiment of the invention this is accomplished by mechanically absorbing the last stroke in the sequence of wire gun movements, occurring in the final winding cycle for the outer coil of the first pair of poles. In other words a dwell or pause is caused, in the reciprocating motion of the wire gun, for a period equivalent to one-half of its normal operating cycle. A span movement occurs at the beginning and end of this period of dwell or pause in the stroke operation of the wire gun and, during the second span movement, the span distance is changed from that of the outer coil to that of the inner coil; and simultaneously, the angular relation of the wire gun and the stator is changed to cause the next pair of poles to be wound. The windings, however, for the second pair of coils will be made in the reverse direction because of the lost stroke between two span movements and, as shown in Fig. 2, the next stroke will lay the winding wires in the slots for the inner coils of poles B and D in the direction opposite that for the corresponding slots of poles A and C.

This reversing action of the wire gun is illustrated graphically in Fig. 4 wherein the dotted circle represents the cycle of the wire gun operation and the solid line represents the path of one of the wire leading fingers of the wire gun. The diameter of the circle represents the total stroke distance of the wire gun and the space between the parallel dash lines represents a distance equal to or slightly greater than the distance between the end openings of the stator.

The stroke movement begins at point S, midway of a span movement which is completed at point T prior to entry of the wire gun into the stator bore. The line T—U represents the passage of the wire gun finger through the stator during the final stroke before the reversal operation occurs; and U—V indicates the last portion of the stroke in which the first half of the final span movement, for an outer coil span, takes place. At the point V the dwell or pause in the stroke movement begins and thus the last half of the final span movement is represented by the straight line V—W. W—X indicates the first span movement for the inner coil of the next pole winding, during which the span distance is changed to accommodate the spacing of the smaller coil slots, and the pole-finger relationship is indexed. When the finger returns to the point V the first stroke for the new coil begins and at X the finger is fully retracted and the wire gun enters the stator to lay the wire along the appropriate slot, indicated by the line X—Y. At Y the wire gun leaves the stator and another span movement begins. At S the next stroke begins and at Z the span movement is completed and the wire gun again enters the stator.

It will now be seen that, because of the lost stroke, or stroke dwell, in the period V—W—V of the normal stroke cycle, the wire gun reciprocation is shifted exactly 180° out of phase with the other operations of the winding machine so that the coil windings will be turned in the opposite direction as indicated in Figs. 2 and 3.

In the form of the apparatus shown in Fig. 1, the mechanism for effecting reversal of the winding operation is connected between the stroke crank driving shafts 20 and 21, and comprises a differential means in the form of an epicyclic train of gears, indicated generally by the numeral 44, and this device is arranged so that normally the shaft 20 is positively driven at a constant speed, through the gears of the epicyclic train 44, by the shaft 21. The assembly of the epicyclic train 44 is, however, mounted for independent rotation about the axis of the shaft 21, to produce a differential action between the shafts 20 and 21, and this rotation is accomplished by means of a worm 45 meshing with a gear quadrant suitably provided on a bracket 46 which supports the epicyclic train; the worm 45 being driven by a gear 47 which in turn is actuated by a rack 48 mounted on the piston rod of an air cylinder 49. The air cylinder 49 is arranged for operation at a predetermined speed and is operated by suitable means, not shown, adapted to actuate an air valve for the air cylinder at predetermined periods and in predetermined relation with the operation of the wire gun, the span control and the indexing components of the winding machine. This control means may be the same as that which governs the operation of the clutch 32 since the indexing of the fixture 10 must occur during the dwell period.

The differential mechanism or epicyclic train 44 is designed to vary the relative speeds or angular positions of the shafts 20 and 21 while they are in operation, and as shown, the device is arranged so that when the epicyclic train 44 is revolved around the axis of the shaft 21, the shaft 20 will be caused to remain stationary for a predetermined period of time, thereby producing a pause or dwell in the operation of the crank 11 through the gears 17 and 18. The speed of movement and the angular extent of revolution of the epicyclic train 44 about the axis of the shaft 21 is precisely controlled by the actuating means 45, 47, 48 and 49 so that the pause or dwell in the operation of the crank 11 will amount to exactly 180° of the normal crank cycle.

This differential mechanism for absorbing 180° of the normal cycle of the stroke operating crank 11 is shown in detail in Figs. 5 to 8 inclusive and, as shown, the device is arranged to be mounted in a gear casing or housing 50 of the stator winding machine.

Referring particularly to Figs. 5 and 6, it will be seen that the drive shaft 21 for the crank 11 enters the housing 50 through a side wall thereof, where the shaft 21 is journaled in a suitable bearing 51. The shaft 21 is disposed in end to end engagement with the extension shaft 20 which carries the bevel gear 18, which in turn drives the bevel gear 17 mounted on the shaft 19 which carries the crank 11. The outer end of the shaft 20 is supported in a suitable bearing 52 which in turn is mounted on the casing 50 and the shaft 19 is supported in a suitable bracket 53, likewise mounted on the casing 50. The inner end of the shaft 20 is supported by an axial pin-like projection 54 which is rotatably journaled in a suitable central bore in the end of the shaft 21. The adjoining ends of the shafts 20 and 21 are connected to respective ends of the gear train 44, and thus, the shaft 21 through the gearing of the epicyclic train positively drives the shaft 20.

The epicyclic train comprises a gear 55 keyed to the inner end of the shaft 21, a gear 56 keyed to the inner end of the shaft 20 and pinions 57 and 58, which in turn are meshed with the gears 55 and 56, respectively, and are fixedly connected together by suitable means 59 to rotate as a unit on a common shaft 60. The shaft 60 is supported between a bracket 61 and an arm 62 mounted for rotation together on the common axis of the shafts 20 and 21. The bracket 61 is journaled on the shaft 21 so as to be freely rotatable thereon, and this bracket is provided with a quadrant gear 63 which in turn is meshed with the worm 45. The arm 62 is journaled on a suitable bearing on the hub 64 of the gear 56. Thus, by rotation of the worm 45, the bracket 61 and arm 62 may be caused to rotate about the axis of the shafts 21 and 20, whereby the gears 57 and 58, which rotate as a unit, may be moved angularly about the periphery of the gears 55 and 56, which movement will result in variation of the relative angular positions of the shafts 20 and 21.

In the form shown, the gears 55 and 57 are of the same diameter and therefore revolve at the same speeds. The gear 58, however, is twice the diameter of the gear 58, which revolves at the same speed as the gear 57. Therefore, with the bracket arm 61 held stationary, the speed ratio between the shafts 20 and 21 is 1 to 2. The bevel gear 17 which drives the crank 11 is, however, half the diameter of the bevel gear 18 which is mounted on and driven by the shaft 20. Therefore, the crank 11 will be turned at the same speed as the drive shaft 21. (See Fig. 6.)

It will now be seen that since the gears 55 and 57 have a 1 to 1 ratio, and the gears 56 and 58 have a 2 to 1 ratio, revolving the bracket 61 about the axis of the shaft 21 will cause the gear 56 and the shaft 20 to be advanced or retarded relative to the shaft 21 by an amount equivalent to the angular distance of rotation of the bracket 61, and according to the direction in which the bracket 61 is turned. Thus, if the bracket 61 is rotated in the same direction that the shaft 21 is turning, the shaft 20 will be relatively retarded; and if the angular extent of rotation of the bracket 61 is 90° the shaft 20 will be retarded 90° relative to the shaft 21. Since the ratio of the gears 18 and 17 is 2 to 1, 90° retardation of the gear 18 will result in 180° retardation of the gear 17, and a like retardation of the crank 11, relative to the drive shaft 21. By rotating the bracket 61 through 90° angularly and at a speed equivalent to one-half the speed of the shaft 21, the period of retardation will be equal to the time for one-half revolution of the shaft 21. It is by this means that the crank 11, which normally revolves at the same speed as the shaft 21, is retarded or stopped for one-half revolution to produce the dwell or pause in the stroke operation of the wire gun.

As before mentioned, the means for actuating the bracket arm 61 of the epicyclic mechanism comprises an air cylinder 49 which is actuated by a source of compressed air, not shown, and the rate of operation of which is controlled by suitable speed control air valves, also not shown. Speed control air valves are well known devices which restrict the air flow in one direction only and are used to regulate the bleed-off rate from the air cylinder, on the side opposite that to which driving pressure is applied, so as to control the speed of piston movement in the air cylinder. The air cylinder 49 operates the rack 48 which is carried on the end of the air cylinder piston rod, and as shown in Figs. 5 to 8 inclusive, the rack 48 drives a gear 47 which is directly connected to and on the same axis as a gear 65, the supporting shafts for the gears 47 and 65 being suitably mounted on a side wall of the casing 50. The gear 65 drives a pinion 66 mounted fast on a cross shaft 67 which in turn carries the worm 45. Thus, actuation of the rack 48 by means of the air cylinder 49 will cause rotation of the worm 45, and through engagement of the worm with the quadrant 63 on the bracket arm 61 will cause the bracket arm to swing about the axis of the shaft 21.

It will be understood, of course, that the length of the stroke of the rack 48 will be such as to produce sufficient rotation of the worm 45 to cause the bracket arm 61 to swing through an arc of 90° and thereby cause the crank 11 to be retarded exactly 180° with respect to the rotation of the shaft 21.

It will also be understood that this retarding of the crank 11 must be at a uniform rate and that the 90° swing of the bracket arm 61 about the axis of the shaft 21 must occur during the time period required for one-half revolution of the drive shaft 21 and at an average speed equal to one-half the angular speed thereof. Or, in other words, the retardation of the crank 11 must occur over the time period for one-half revolution of the normal crank operation. This is necessary to hold the wire gun in a stationary position during the pause or dwell period, as shown in the diagram of Fig. 4. The operation of the air cylinder 49 must, of course, be precisely controlled to occur at exactly the right time when the winding of the outer coils of the first poles of the stator has been completed. As before mentioned, this timing is controlled by a suitable cycle-counting control mechanism, not shown, designed to cause operation of the air cylinder 49 after the wire gun has performed a predetermined number of winding operations or has laid a predetermined number of turns in the stator coil, and at the same time that the clutch 38 is operated for the indexing function.

While an air cylinder and rack is shown as the means for operating the worm 45 which in turn operates the bracket 61 of the epicyclic train, it will be understood that the worm drive might comprise a mechanical device such as a single turn clutch operating at a predetermined speed and driven by a suitable connection to a continuously operating part of the winding machine. The control for the intermittent operation of this clutch may be the same as that employed for the control of the indexing clutch 38. Therefore, since the means for actuating the bracket arm 61 may be of any suitable form or construction, I have no intention of limiting my invention to the particular means which may be employed for accomplishing that purpose.

When the winding of the stator coils has been completed the winding machine is stopped and the stator is removed from the fixture 10, whereupon the winding reverse mechanism is returned to its initial position by return operation of the air cylinder 49. A new stator to be wound is then mounted in the fixture and the wire gun, and the associated machine parts are set in proper starting position by means of the hand wheel shown at the right side of Fig. 1.

In the event a mechanical clutch means, such as the single turn clutch before-mentioned, is employed for actuating the wire gun reversing mechanism, instead of the air cylinder 49, then a gear having a full tooth circle may be employed on the bracket 61, instead of the quadrant or gear segment 63, and the bracket movement need never be reversed. In such case the gear will be located to clear the path of the bracket 61 and the bracket will always be shifted, in one direction only, in increments of 90° of angular movement. This arrangement will permit the winding of a stator having more than four poles and, therefore, requiring more than one dwell period in the wire gun operation.

While the invention herein disclosed has been shown and described as winding a 4 pole-4 slot stator it will be understood that the mechanism may also be used to wind a 4 pole, 6 slot stator, in which three coils are provided for each pole. In such a case the only change in the machine will be in the span control mechanism which is described ni my aforesaid co-pending application. Also the same principles of operation may be embodied in the process of winding a stator having six or more poles, the principal changes in the winding machine operation being in the fixture indexing mechanism and the span control means, as will be readily uderstood by those skilled in this art.

The main advantages of this invention reside in the simplicity of the wire gun construction and operation; and in the fact that the winding of the stator may be done in one continuous high speed operation which is wholly automatic from beginning to end. Other advantages will be found in the high degree of acuracy in the operation of the mechanism and in the fact that the human factor is obviated in the actual coil winding process.

Although but one specific embodiment of this invention is herein shown and described it will be understood that numerous details of the construction shown may be altered or omitted without departing from the spirit of this invention as defined by the following claims.

I claim:

1. In a coil winding machine, the combination of a wire gun mounted for reciprocating movement along a predetermined path, a drive means having connection with said wire gun for reciprocating said wire gun at a continuous predetermined rate, means driven by said drive means for turning said wire gun through a predetermined angular distance during the end portion of each stroke, said turning means operating intermittently in successively alternate directions, means connected between said drive means and said wire gun and operable to interrupt the reciprocating movement of said wire gun for the period of one stroke thereof and permit two successive operations of said turning means at the end of one wire gun stroke, and means for actuating the last named means.

2. In a coil winding machine comprising a wire gun mounted for reciprocating stroke movement along a predetermined path, rotary means having a crank connection with said wire gun for reciprocating said wire gun in successive cycles of simple harmonic motion, a continuously rotating drive shaft, a positive driving connection between said shaft and said rotary means including a gear train operable to vary the relative speed ratio of said shaft and rotary means, and means to operate said gear train to change the rotational angular relation of said shaft and said rotary means with respect to each other by a predetermined amount.

3. In a coil winding machine comprising a wire gun mounted for reciprocating stroke movement along a predetermined path, rotary means having a connection with said wire gun for reciprocating said wire gun in successive cycles of simple harmonic motion, a continuously rotating drive shaft, a driving connection between said shaft and said rotary means including an epicyclic gear train adapted to transmit motion from said shaft to said rotary means, said gear train being mounted for angular movement about the axis of said shaft, and adapted to vary the speed ratio between said shaft and rotary means during such movement, and means for shifting said gear train angularly about said shaft, said means normally holding said gear train stationary.

4. In a coil winding machine comprising a wire gun mounted for reciprocating stroke movement along a predetermined path, rotary means having a connection with said wire gun for reciprocating said wire gun in successive cycles of simple harmonic motion, a continuously rotating drive shaft, a driving connection between said shaft and said rotary means including an epicyclic gear train adapted to transmit motion from said shaft to said rotary means, said gear train being mounted for angular movement about the axis of said shaft and adapted to vary the speed ratio between said shaft and rotary means during such movement, and drive means for shifting said gear train through a predetermined distance angularly about said shaft to vary the rotational angular relation of said shaft and said rotary means by a predetermined amount, said drive means normally holding said gear train stationary.

5. In a coil winding machine comprising a wire gun mounted for reciprocating movement, a drive means for reciprocating said gun in continuous cycles of simple harmonic motion, an intermittently operated means for turning said wire gun in alternate directions on its axis of reciprocation during respective half-cycle periods in each normal cycle of wire gun reciprocation, differential mechanism included with said drive means and operable thereon to retard the reciprocating movement of said wire gun during a half-cycle interval occurring between two successive ones of said periods, and means for operating said differential mechanism.

6. In a coil winding machine comprising a wire gun mounted for reciprocating movement, a drive means for reciprocating said wire gun in continuous uniform cycles of simple harmonic motion, and intermittently operated means for turning said wire gun in alternate directions on its axis of reciprocation during respective half-cycle periods in each normal cycle of wire gun reciprocation, means included with said drive means operable to stop the reciprocating movement of said wire gun during a half-cycle interval occurring between two successive ones of said periods, and means for actuating the last named means.

7. In a coil winding machine comprising a wire gun mounted for reciprocating movement, a drive means for reciprocating said wire gun in continuous uniform cycles of simple harmonic motion, and uniformly operated intermittent means for turning said wire gun in alternate directions on its axis of reciprocation during the middle and end periods respectively of each normal cycle of wire gun operation, means included with said drive means operable to stop the reciprocating movement of said wire gun during a half-cycle interval occurring between two successive ones of its turning movements, and means to actuate the last named means.

8. In a coil winding machine comprising a wire gun mounted for reciprocating movement, a driven means for reciprocating said wire gun in continuous cycles of simple harmonic motion, and means for turning said wire gun in alternate direction on its axis of reciprocation during the middle and end periods respectively of each cycle, a continuously rotating drive shaft, a second shaft having driving connection with said driven means and aligned end to end with said drive shaft, an epicyclic gear train mounted for rotation about the common axis of said shafts and having a driving connection with the mutually adjacent ends of said shafts, said gear train being adapted to vary the speed of said second shaft relative to said drive shaft when rotated about the axis thereof, means for rotating said gear train in the direction to retard the speed of said second shaft and displace the same through a predetermined angular distance relative to said drive shaft, and means to actuate the last named means.

9. In a coil winding machine comprising a wire gun mounted for reciprocating movement, a driven means for reciprocating said wire gun in continuous cycles of simple harmonic motion, and continuously driven means for turning said wire gun in alternate directions on its axis of reciprocation during the middle and end periods respectively of each cycle, a continuously rotating drive shaft, a second shaft connected to said driven means and aligned end to end with said drive shaft, an epicyclic gear train mounted at the adjacent ends of said shafts for rotation about the common axis of said shafts and connected at each end to a respective one of said shafts, said gear train being adapted to vary the speed of said shafts relative to each other when rotated about the common axis thereof, means for rotating said gear train a predetermined amount in the direction to retard the speed of said second shaft and displace the same an angular distance equivalent to one-half of a single complete cycle of wire gun motion, and means for actuating the last named means during a half-cycle interval of wire gun motion.

THADDEUS F. HARVEY.

References Cited in the file of this patent

UNITED STATES PATENTS

| Number | Name | Date |
| --- | --- | --- |
| 1,370,744 | Diehl | Mar. 8, 1921 |
| 1,431,947 | Gysel | Oct. 17, 1922 |
| 1,504,253 | McCord | Aug. 12, 1924 |
| 1,612,026 | Jannel | Dec. 28, 1926 |
| 2,027,735 | Klocke | Jan. 14, 1936 |
| 2,197,117 | Ammann et al. | Apr. 16, 1940 |
| 2,445,937 | Carpenter | July 27, 1948 |